No. 636,546. Patented Nov. 7, 1899.
F. X. MUDD & E. HEDRICK.
POULTRY CAR.
(Application filed Apr. 4, 1898.)
(No Model.) 7 Sheets—Sheet 1.
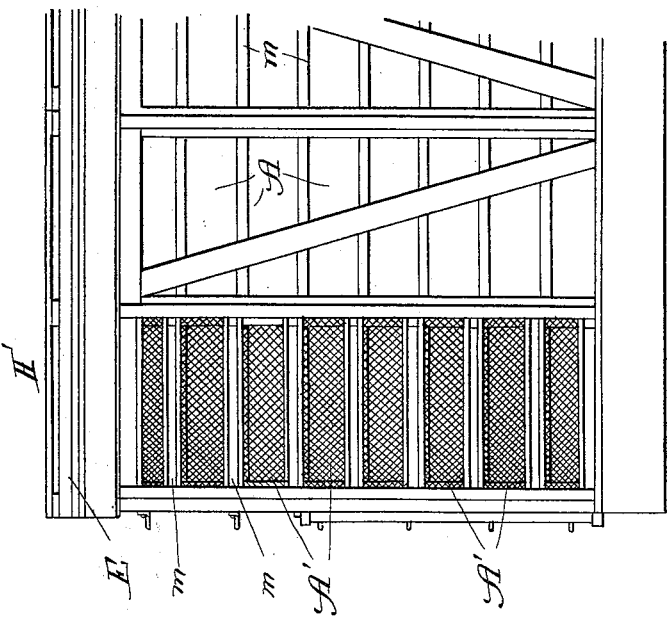
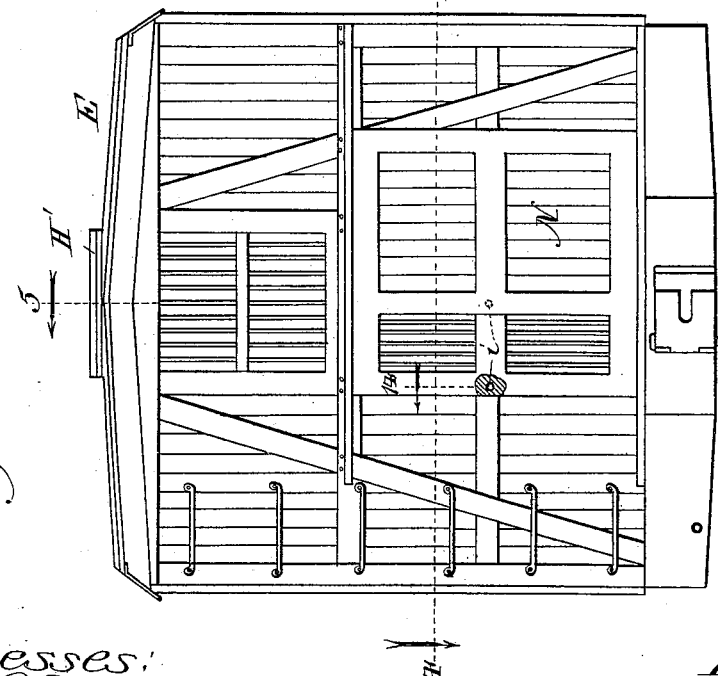
Witnesses: Inventors:
Francis X. Mudd,
Elias Hedrick,
By Dyrenforth and Dyrenforth,
Attys.

No. 636,546. Patented Nov. 7, 1899.
F. X. MUDD & E. HEDRICK.
POULTRY CAR.
(Application filed Apr. 4, 1898.)

(No Model.) 7 Sheets—Sheet 2.

Witnesses:
Inventors:
Francis X. Mudd,
Elias Hedrick,
By Dyrenforth and Dyrenforth,
Attys.

No. 636,546. Patented Nov. 7, 1899.
F. X. MUDD & E. HEDRICK.
POULTRY CAR.
(Application filed Apr. 4, 1898.)
(No Model.) 7 Sheets—Sheet 3.

No. 636,546. Patented Nov. 7, 1899.
F. X. MUDD & E. HEDRICK.
POULTRY CAR.
(Application filed Apr. 4, 1898.)
(No Model.) 7 Sheets—Sheet 4.

No. 636,546. Patented Nov. 7, 1899.
F. X. MUDD & E. HEDRICK.
POULTRY CAR.
(Application filed Apr. 4, 1898.)
(No Model.)
7 Sheets—Sheet 5.

Witnesses:

Inventors:
Francis X. Mudd,
Elias Hedrick,
By Dyrenforth & Dyrenforth,
Attys.

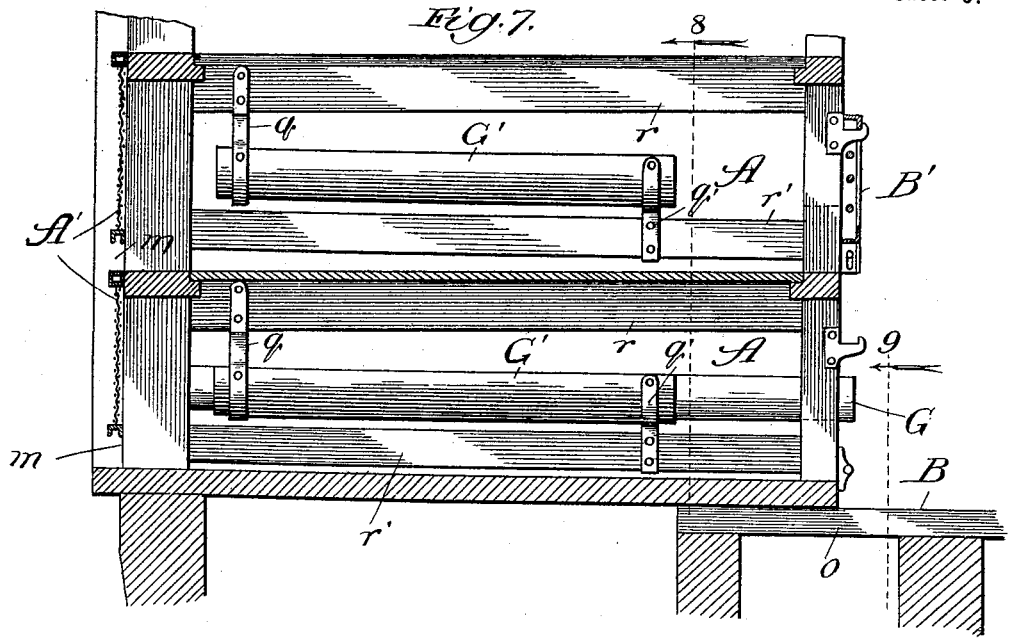
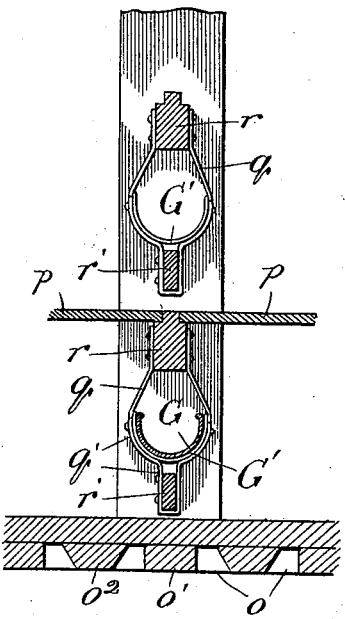
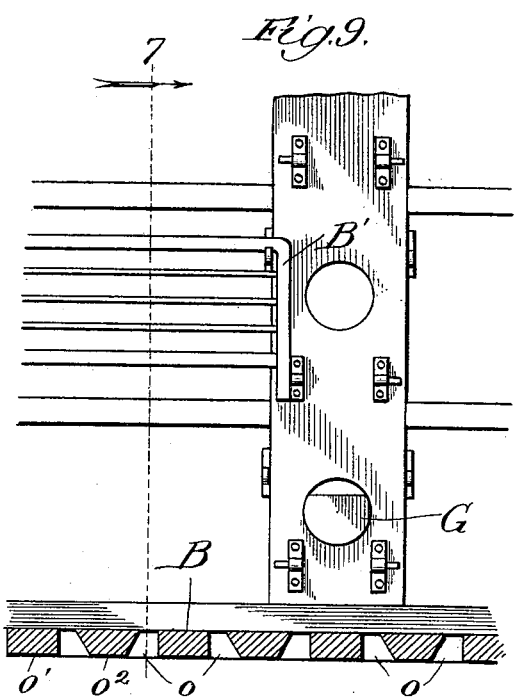

No. 636,546. Patented Nov. 7, 1899.
F. X. MUDD & E. HEDRICK.
POULTRY CAR.
(Application filed Apr. 4, 1898.)
(No Model.) 7 Sheets—Sheet 7.
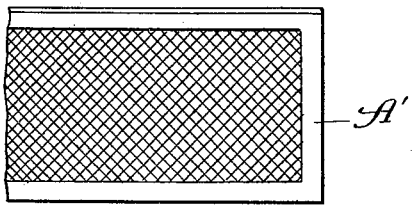
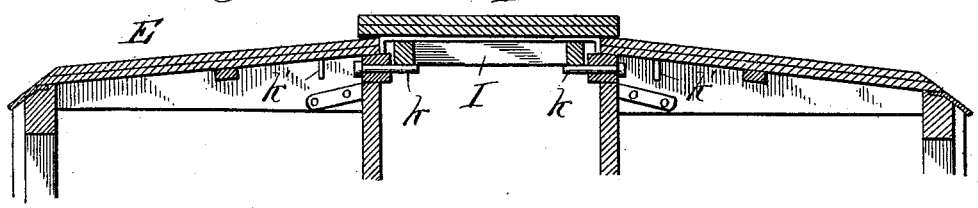
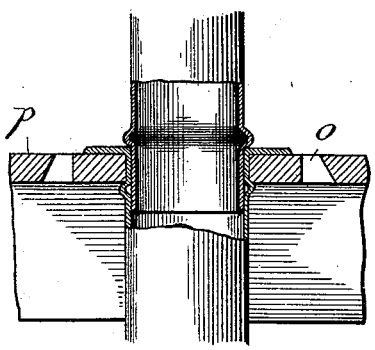
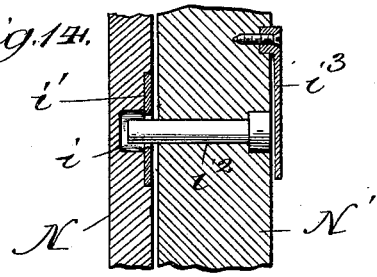
Witnesses:
Inventors:
Francis X. Mudd,
Elias Hedrick,
By Dyrenforth and Dyrenforth,
Attys.

UNITED STATES PATENT OFFICE.

FRANCIS X. MUDD AND ELIAS HEDRICK, OF CHICAGO, ILLINOIS, ASSIGNORS TO THE LIVE POULTRY TRANSPORTATON COMPANY, OF SAME PLACE.

POULTRY-CAR.

SPECIFICATION forming part of Letters Patent No. 636,546, dated November 7, 1899.

Application filed April 4, 1898. Serial No. 676,451. (No model.)

*To all whom it may concern:*

Be it known that we, FRANCIS X. MUDD and ELIAS HEDRICK, citizens of the United States, residing at Chicago, in the county of Cook and State of Illinois, have invented a new and useful Improvement in Poultry-Cars, of which the following is a specification.

Our invention relates to an improvement in the class of railway-cars now in quite common use for the shipment of live poultry and involving, as the generally-stated construction, tiers of coops equipped with facilities for feeding and watering the poultry and provided at opposite sides of a longitudinal aisle running centrally of the car, at the center of which the aisle is enlarged into a compartment or "stateroom" for the accommodation of the attendant or attendants and for other purposes. The poultry-car in which we are more particularly concerned contains improvements set forth in Letters Patent of the United States No. 444,266, dated January 6, 1891, No. 489,657, dated January 10, 1893, and No. 539,229, dated May 14, 1895. Experience due to our quite extended practical use of this car has suggested the desirability of improvement in various directions, with the result of the improvements forming the subject of this application, as we will particularly point out in the claims concluding this specification.

Figure 3:
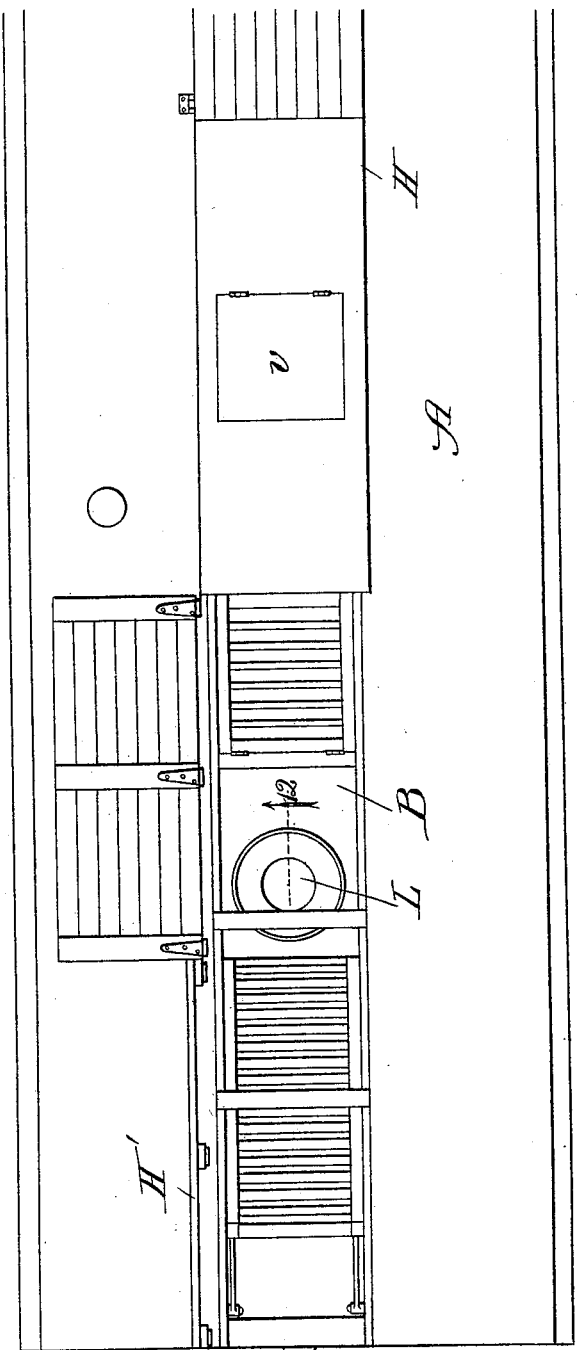
Figure 4:
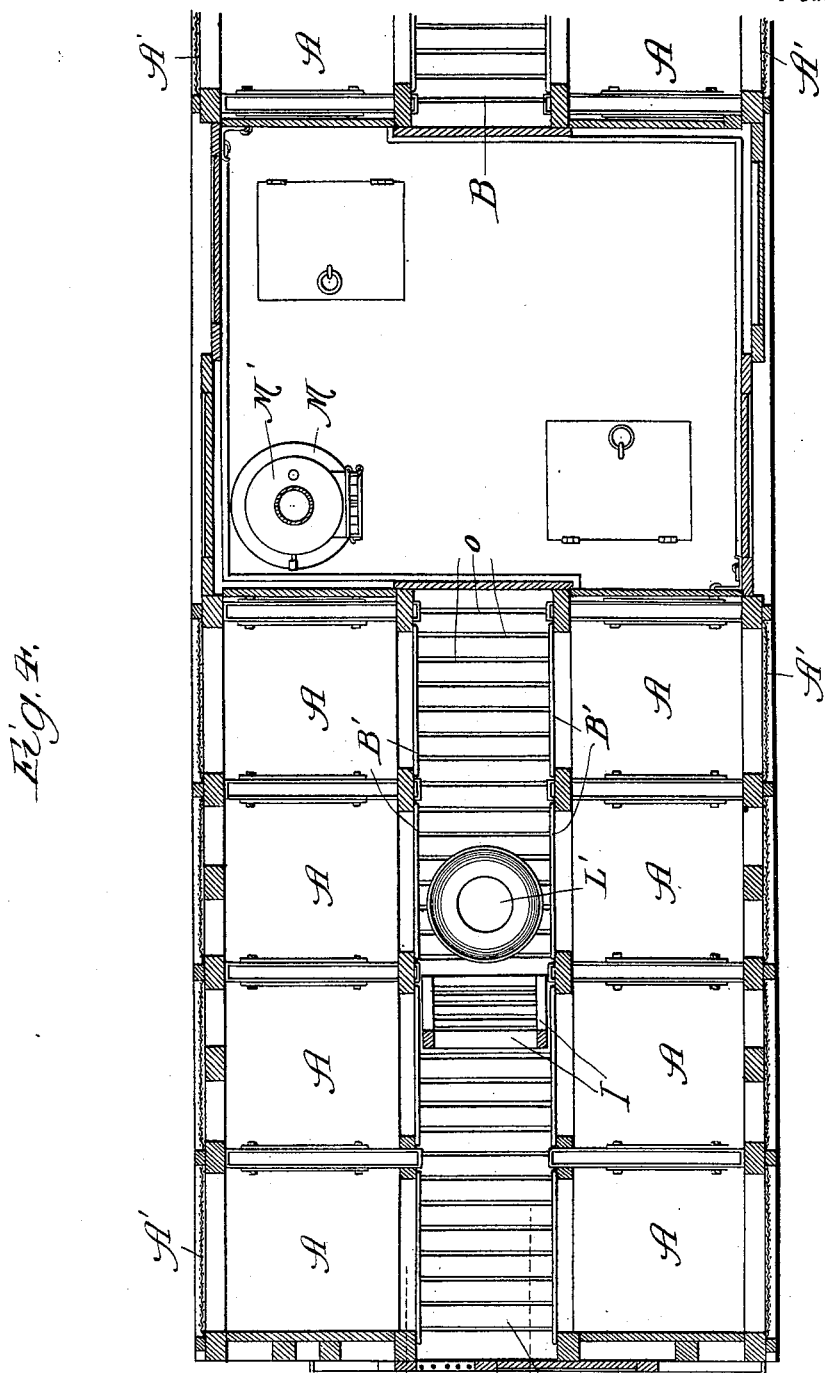
Figure 5:
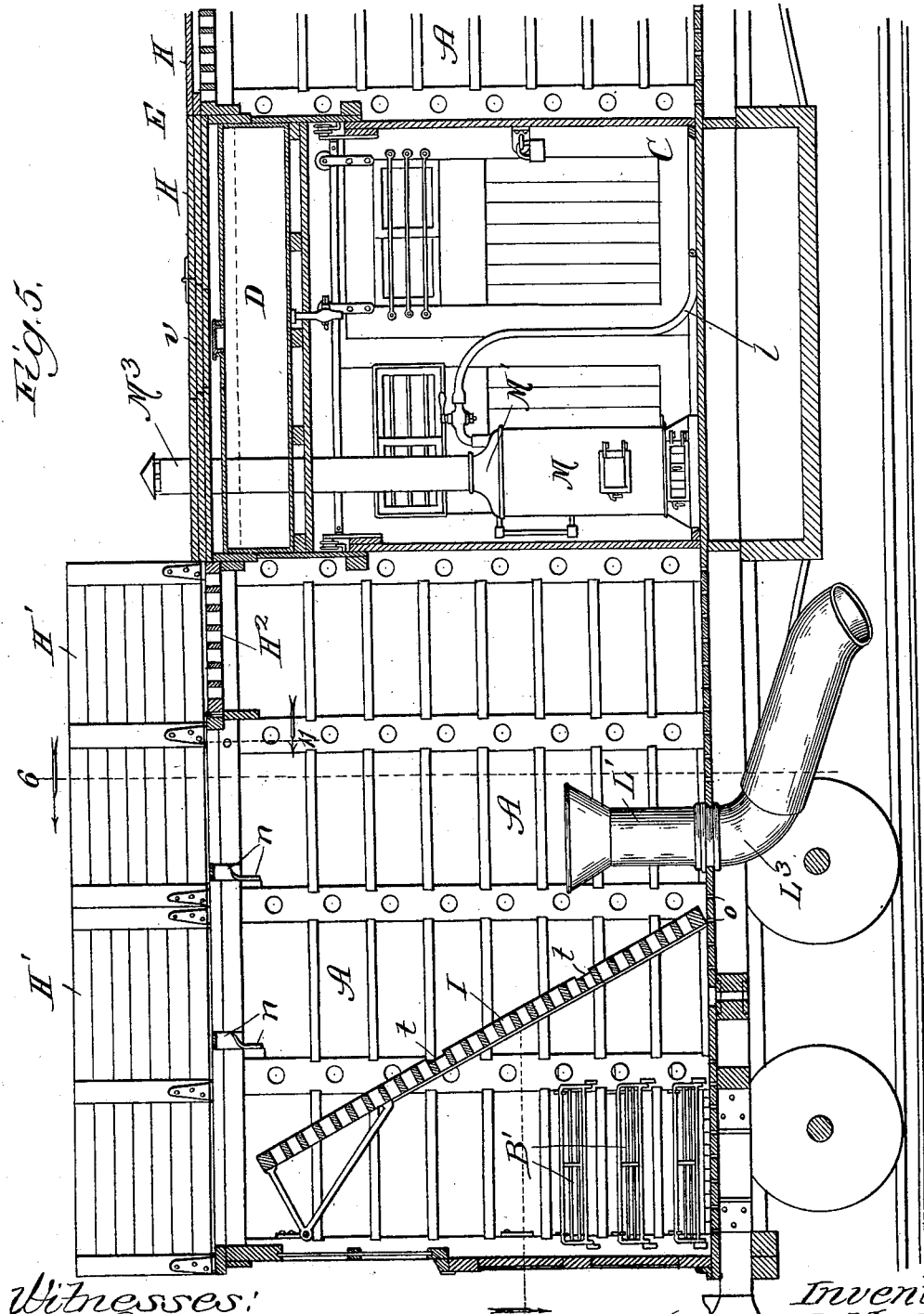
Figure 6:
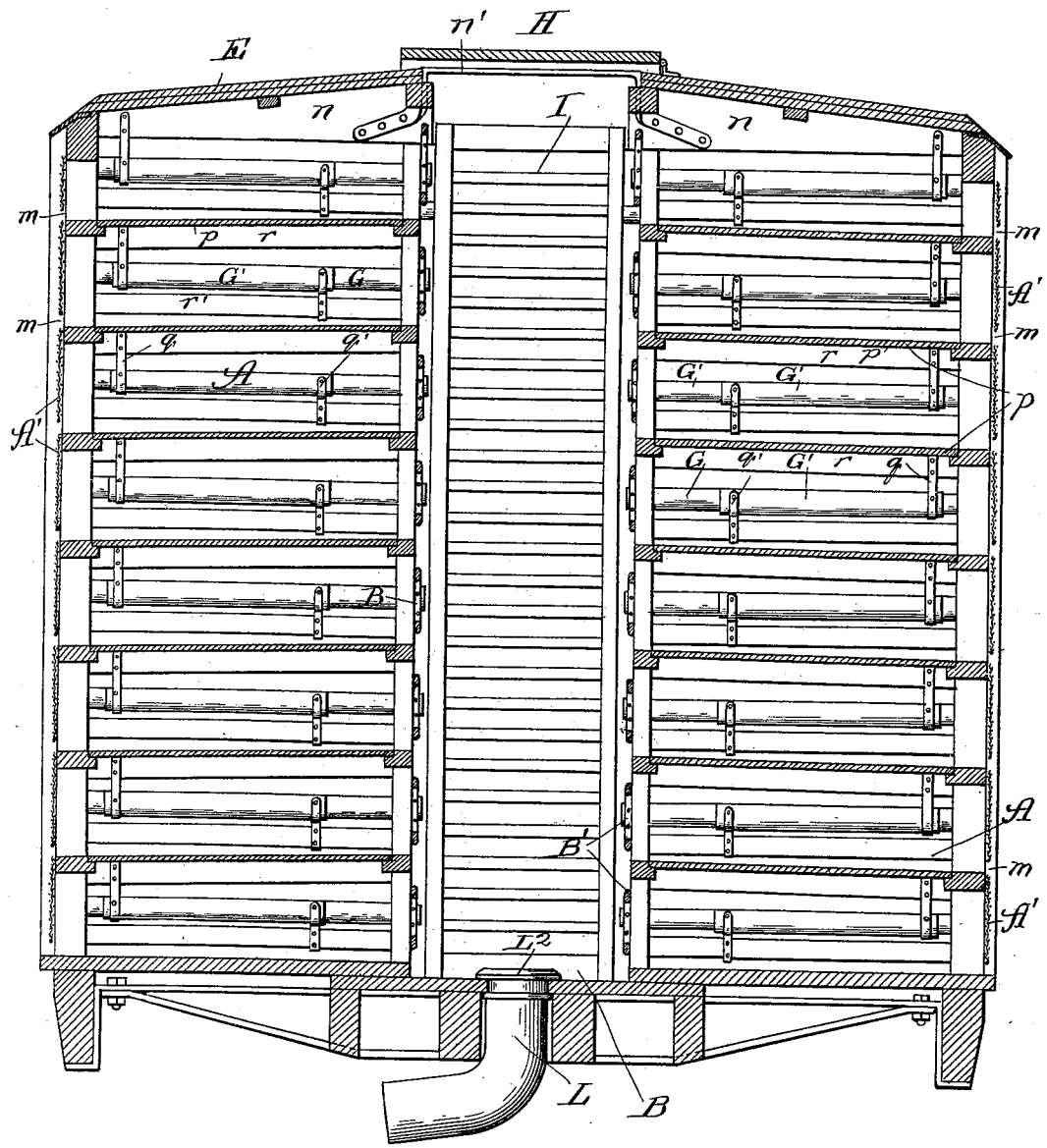

Referring to the accompanying drawings, Figure 1 is a view in end elevation of the body of a live-poultry-shipping car; Fig. 2, a view in side elevation of an end portion of the same; Fig. 3, a top plan view of a portion of the car, showing the hinged sections or doors of which the running-board is formed in different reliatve positions, with the adjustable ladder and other details in place; Fig. 4, a plan section taken at the line 4 on Fig. 1 or at the line 4 on Fig. 5 and viewed in the direction of the arrow; Fig. 5, a longitudinal section of a portion of the car, taken at the line 5 on Fig. 1 or at the line 5 on Fig. 4 and viewed in the direction of the arrow; Fig. 6, a transverse section taken at the line 6 on Fig. 5 and viewed in the direction of the arrow; Fig. 7, a section taken at the line 7 on Fig. 9 and viewed in the direction of the arrow, showing the inclined coop-floor and the relative disposition of the feed-trough and other parts forming an end wall of each coop to prevent escape of the poultry from one coop to another; Fig. 8, a broken section taken at the line 8 on Fig. 7, showing the construction of the ventilating aisle-floor; Fig. 9, a broken section taken at the line 9 on Fig. 7 and viewed in the direction of the arrow, showing an adjustable hinged coop-door in front elevation; Fig. 10, a broken view, in front elevation, of the outside screen covering of a coop; Fig. 11, a section taken at the line 11 on Fig. 5 and viewed in the direction of the arrow; Fig. 12, a section taken at the line 12 on Fig. 3, viewed in the direction of the arrow and enlarged; Fig. 13, an edge view of the chute-cover; and Fig. 14, a broken section taken at the line 14 on Fig. 1, viewed in the direction of the arrow and enlarged.

A A denote the coops arranged in tiers in the car at opposite sides of the longitudinal aisle B, extending from opposite ends of a central compartment or stateroom C, in the top of which is supported the tank D for containing the supply of water and which is accessible through a trap-door $v$ in the car-roof E. The general construction of each coop A is that set forth in the aforesaid Letters Patent, involving the outer screen covering A', with the cleaning-space $m$ below it, as set forth in the Patent No. 444,266, the hinged open-work aisle-door B' for each coop being preferably constructed, as shown, substantially in accordance with the Patent No. 489,657, and the trough G being removably supported in a shield G', as shown in the Patent No. 539,229, to extend beneath the beams $r$ of the coop-frames to form a part of the end closure of the coop. Our improvement in the coops consists in laying the floor $p$ of each to cause it to slant downward from the aisle side of the coop to the opening $m$ at the opposite side, and thereby tend the better to shed the dirt from the floor by causing it to fall out through the openings $m$ under the jolting action of the car in motion and the scratching of the poultry in the coop. The trough G and its supporting-shield require to occupy a horizontal position to retain the trough contents, and as the openings above and below the trough thus increase in width toward the outer side of the coop to effect sufficient closure thereof to prevent escape of the poultry from one coop to another the beam $r$ above the trough and the slat $r'$ are disposed accordingly. Moreover, we prefer now for the sake of stability to support the shield G' at one end on hangers $q$, depending from the beam $r$, and at its opposite end by a rigid fork $q'$, Fig. 8, extending upward from the slat $r'$.

For purposes of ventilation the floor of the aisle B is provided with openings $o$ at intervals, widest at their lower ends and converging upward, thereby to afford to them a funnel shape tending to compress the air introduced through them by the force of the car in motion and which expands on entering the interior of the car, thereby to impart sufficient force to it to effect adequate ventilation. To produce the desired shape of ventilating-opening in the floor of the aisle B, we provide floor-bars $o'$ and $o^2$, respectively, of the rectangular and cone-frustum shapes in cross-section illustrated and lay them to afford the intervening spaces forming the openings $o$.

The running-board H on the car-roof contains sections, each hinged at one edge to afford a door H', Fig. 3, adapted to be opened and closed to permit access to the aisle B from the roof. At one end of the aisle B, and preferably in each section thereof extending from the stateroom C, is hinged near one extremity to the end wall of the car, near the roof, Fig. 5, a ladder I, the length of which should be such as to cause it when lowered to rest at its lower end on the aisle-floor and occupy an inclined position. When raised to a horizontal position, the ladder extends along the bottom of the running-board between the carlines $n$, which are cut away over the aisle, across which the severed ends of each carline are connected together to afford the desired strength for carrying the roof by raised metal bars $n'$, against which the upper side of the ladder when raised bears at recesses $t$, provided at intervals in it to admit the lower sides of the bars.

By turning the ladder I to the position in which it is represented in Fig. 5 from its raised horizontal position (wherein it is held out of the way by slide-bolts $k$, shown in Fig. 11, supported in suitable bearings and adapted to be withdrawn from obstructing the lowering of the ladder against limiting-stops $k'$) it affords a convenient means of access between the interior of the car and its roof to enable the car to be conveniently loaded and unloaded through the doors H' from and to an upper story in a building or over the tops of other cars blocking the way to the poultry-car.

As a means for rapidly unloading the car from the bottom thereof we provide a chute L at a convenient point in the aisle-floor and which is closed when out of use by a suitable cover $L^2$. A hopper L' seats in the upper end of the chute, and the lower end has swiveled upon it an elbow $L^3$, adapted to be turned to discharge at any point, as into a coop suitably placed on the ground. We find that by dropping the poultry into the hopper they pass rapidly through the chute and emerge therefrom into the receptacle provided to receive them without injury and that a car of poultry may be thus unloaded very expeditiously and conveniently.

At M is represented in the stateroom C for warming it a heater, which is preferably a generator of steam to be used for cooking the feed to be supplied to the poultry by injecting into it the steam through the medium of a hose $l$, leading from the steam-dome M'. We further utilize the heater as a means for keeping the tank-water warm and preventing it from freezing by passing through it the hot products of combustion through the medium of the outlet-duct (shown as a pipe $M^3$) extended through the tank D beyond the roof of the car.

In the roof, between the point to which the free end of the ladder L reaches when in its horizontal position and the adjacent wall of the compartment C, is provided, below a door H', a hinged open-work section $H^2$, affording a ventilating-door adapted to be raised to permit ingress to and egress from the car through its roof when the ladder is raised.

Sliding grated doors N are provided in the end walls of the car. A feature of our improvement relates to the provision of simple and readily-operative means for effectually locking these doors against being opened from without. To this end each door contains in its inner side, near its rear edge, a recess $i$, Fig. 14, faced with a perforated metal plate $i'$, and which is brought by sliding the door shut into coincidence with a bolt $i^2$, supported to slide in an opening provided to receive it in the door-jamb N', at the inner side of which is pivoted a drop-plate $i^3$ in position to hang over the bolt-opening when the bolt is shot to enter the recess $i$. To enable the door to be opened, the bolt is withdrawn out of the recess $i$, to permit which the drop-plate is raised on its pivot out of the way of obstructing the withdrawal. In this position of the bolt the drop-plate hangs against it to one side of the bolt-opening. When the door is closed, it may be locked by shooting the bolt into the recess $i$, when the drop-plate drops to cover the head of the bolt and retain it against displacement, as by any attempt to throw it back from without the car.

Referring to the ladder and the manner in which it is hinged, it will be noted that the hinge is constructed and arranged to lift the hinged end of the ladder when raised to place it in a horizontal position within the roof-opening between the ends of the carlines and above the upper tiers of coops, so as to allow access thereto. When so elevated, the ladder serves the important purpose of forming a closure of open-work for the roof-opening and a ventilator, and in this function the hinged open-work section when closed, as seen in Fig. 5, forms an extension of the ladder and provides a roof-doorway when the ladder is elevated.

What we claim as new, and desire to secure by Letters Patent, is—

1. In a poultry-car divided longitudinally by an aisle into tiers of coops extending from the floor to the top of the car and having hinged running-board sections, roof-carlines interrupted at the crossing of the aisle and connected at such crossing by means elevated above the carlines, in combination with a ladder hinged at one end within the aisle in a manner and supported when raised to uncover the top tiers of coops on both sides of the aisle.

2. In a poultry-car divided into tiers of coops separated by a longitudinal aisle and having hinged running-board sections, the roof-carlines interrupted at the crossing of the aisle, means crossing the aisle and connecting the ends of the carlines at or above the plane of their upper sides, in combination with a ladder and means for hinging it to the end wall of the car in the aisle whereby the ladder while serving as the means for loading and unloading from the roof may be elevated and supported when raised to give a clear way for access to the top tiers of coops on both sides of the aisle.

3. In a poultry-car divided internally into tiers of coops separated by a longitudinal aisle, and having hinged running-board sections, the roof-carlines extending from the sides of the car to the sides of the aisle-walls, the aisle ends of said carlines connected by upward-bent tie-bars crossing the aisle at the top and above the carlines, in combination with a ladder hinged to the end wall of the car in the aisle at a point below the roof, by a lifting-bracket, which, in connection with the raised carline tie-bars and notches $t\ t$ in the ladder-bars coincident with the bends in said tie-bars, allows the ladder to be raised to the roof to give a clear way for access to the top tier of coops.

4. In a poultry-car and in combination with tiers of coops arranged on each side of a longitudinal aisle, a roof-opening and hinged running-board doors therefor, the roof-carlines interrupted at the crossing of the aisle, tie-bars for the carlines elevated within the roof-opening, a ladder and a truss-hinge therefor in the aisle on the end wall of the car constructed and arranged to cause the hinged end of the ladder to be lifted whereby when raised it is placed within the roof-opening, and means for supporting the free end of the ladder in a horizontal plane within the roof-opening for the purpose stated.

5. In a poultry-car and in combination with tiers of coops arranged on each side of a longitudinal aisle, a roof-opening and hinged running-board doors therefor, the roof-carlines interrupted at the crossing of the aisle, means for connecting the carlines at such crossing on a plane with the roof-opening, a ladder hinged on the end car-wall within the aisle, and adapted by its hinge to be elevated to a horizontal position within the roof-opening, and a hinged open section in the door-opening forming an extension of the ladder when elevated and with the latter a slotted closure for the roof-opening and a ventilating-door adapted to be raised when the ladder is elevated for the purpose stated.

FRANCIS X. MUDD.
ELIAS HEDRICK.

In presence of—
M. J. FROST,
R. T. SPENCER.